US012370572B2

(12) United States Patent
Zhang

(10) Patent No.: US 12,370,572 B2
(45) Date of Patent: Jul. 29, 2025

(54) CAULKING GUN WITH MULTI-GEAR AND ADJUSTABLE THRUST RATIO

(71) Applicant: Yaozhong Zhang, Shanghai (CN)

(72) Inventor: Yaozhong Zhang, Shanghai (CN)

(73) Assignee: Trader Harbor Co., Limited, Shanghai (CN)

( * ) Notice: Subject to any disclaimer, the term of this patent is extended or adjusted under 35 U.S.C. 154(b) by 0 days.

(21) Appl. No.: 18/015,543

(22) PCT Filed: Oct. 13, 2022

(86) PCT No.: PCT/CN2022/124997
§ 371 (c)(1),
(2) Date: Jan. 11, 2023

(87) PCT Pub. No.: WO2023/231270
PCT Pub. Date: Dec. 7, 2023

(65) Prior Publication Data

US 2025/0083179 A1 Mar. 13, 2025

(30) Foreign Application Priority Data

May 31, 2022 (CN) ........................ 202221410810.0

(51) Int. Cl.
*B05C 17/005* (2006.01)
*B05C 17/01* (2006.01)

(52) U.S. Cl.
CPC ................................ *B05C 17/0123* (2013.01)

(58) Field of Classification Search
CPC . B05C 17/0123; B05C 17/01; B05C 17/0126; B05C 17/0136
USPC ........................................ 222/309, 326, 391
See application file for complete search history.

(56) References Cited

U.S. PATENT DOCUMENTS 4,339,058 A * 7/1982 Wendt .................... B05C 17/01 222/326
5,197,635 A * 3/1993 Chang ............... B05C 17/00553 222/391
8,544,700 B2 * 10/2013 Chen .................. B05C 17/0103 222/391
9,731,318 B2 * 8/2017 Yi ....................... B05C 17/0123
11,364,519 B2 * 6/2022 Li ....................... B05C 17/0136
11,517,935 B1 * 12/2022 Li ....................... B05C 17/0126
(Continued)

*Primary Examiner* — Charles P. Cheyney
(74) *Attorney, Agent, or Firm* — Jose Cherson Weissbrot

(57) ABSTRACT

A caulking gun with multi-gear and adjustable thrust ratio is provided. In the caulking gun, the rotating trigger is pivotally connected to the fixed handle through a gear adjustment mechanism, which consists of a segmented circular limiting hole, a sliding groove and a segmented cylinder fixed pin. The sliding groove consists of groove openings respectively on the two sides of the connection part of the rotating trigger, and the sliding groove includes at least two limiting teeth formed by at least two successively connected locating holes. The segmented cylinder fixed pin passes through the segmented circular limiting hole and both ends extend out respectively from the sliding groove openings of both sides. The width of the connection of each two locating holes is the passing width of the limiting teeth, and the minimum width of the segmented cylinder fixed pin is slightly less than the passing width of the limiting teeth.

10 Claims, 6 Drawing Sheets

(56) References Cited

U.S. PATENT DOCUMENTS

| | | | | |
|---|---|---|---|---|
| 2002/0092871 | A1* | 7/2002 | Rickard | A61B 17/8822 222/391 |
| 2009/0134187 | A1* | 5/2009 | Hefele | B05C 17/0126 222/391 |
| 2019/0299244 | A1* | 10/2019 | Xia | B05C 17/0123 |
| 2023/0028417 | A1* | 1/2023 | Li | B05C 17/014 |

* cited by examiner

CAULKING GUN WITH MULTI-GEAR AND ADJUSTABLE THRUST RATIO

TECHNICAL FIELD

The invention relates to the technical field of caulking guns, in particular to a caulking gun with multi-gear and adjustable thrust ratio.

BACKGROUND

The caulking gun is a very helpful tool for bonding, sealing, caulking and other operations, based on the principle of leverage. It uses with silicone cartridges so that the silicone in the silicone cartridges can be easily extruded from the mouth of the cartridges and realize the function of dispensing of silicone or other similar caulking material.

The caulking gun shown in FIG. 1 comprising a fixed handle 1', a rotating trigger 2', a pusher plate 6' and caulk tube mounting barrel 7', and the rotating trigger 2' can be pivotally connected to the fixed handle 1' through a trigger fixed pin 4' so that the rotating trigger 2' can be rotated around the trigger fixed pin in an angle range, and the upper end of the rotating trigger 2' is provided with a trigger pusher pin 3' that can detachably abut against the pusher plate 6' (Usually horizontal axial structure). When pulling the rotating trigger 2', the rotating trigger 2' is rotating by taking the trigger fixed pin 4' as the fulcrum, and uses the principle of leverage to push the trigger pusher pin 3' to act on the pusher plate 6' and provide a thrust to the pusher plate 6', then the pusher plate 6' pushes the pusher rod 8' linked with it, and the pusher rod 8' acts on the caulk tube disposed in the caulk tube mounting barrel 7' to push forward to extrude the silicone. The distance from the main stress position of the rotating trigger 2' to the trigger fixed pin 4' forms the power arm of the lever, and the distance from the trigger pusher pin 3' to the trigger fixed pin 4' forms the resistance arm of the lever, and the ratio constituted by the power arm and the resistance arm is called the thrust ratio of the caulking gun.

Most of the caulking guns on the market are made with a fixed single thrust ratio, and their structure and working principle are as described above. The fulcrum of this type of caulking gun is fixed, and it only has a single thrust ratio. When using it, customers need to purchase caulking guns with different thrust ratios according to the silicone products of different viscosities. Therefore, if a caulking gun can provide more than two thrust ratios, it can greatly save product cost and storage space, and improve convenience and efficiency.

Then come the adjustable caulking gun with two thrust ratios. The caulking gun shown in FIG. 2 is the latest caulking gun product with adjustable thrust ratio on the market. It also comprising: fixed handle 1", rotating trigger 2", pusher plate 6" and caulk tube mounting barrel (not shown in the figure), when the trigger 2" is pulled and turned, the trigger pusher pin 3" acts on the pusher plate 6" and provides a thrust to the pusher plate 6", then pushing the pusher plate 6" and the pusher rod 8" linked with it, and the pusher rod 8" acts on the caulk tube arranged in caulk tube mounting barrel to extrude the silicone. In order to realize the adjustment of the thrust ratio, the original fixed pin connecting the fixed handle 1" and the rotating trigger 2" is replaced by the gear adjustment mechanism 4". The adjustment mechanism 4" includes an arc-shaped slip groove 41" and a circular pin 42", through the curved displacement of the circular pin 42" in the arc-shaped slip groove 41" (as shown in FIG. 3) to realize the adjustment of the two thrust ratios. Although this structure can provide two kinds of thrust ratios, it still has the following disadvantages: first, it is difficult to achieve stable positioning of the circular pin 42" in the arc-shaped slip groove 41" when using. It is easy to slip away, and interrupt the operation; second, this structure can only provide two kinds of thrust ratios based on the design of the two ends of the arc-shaped slip groove 41", and cannot provide more than two kinds of selection of thrust ratio in a same caulking gun.

Therefore, there is a need to obtain a caulking gun with a more stable structure and a better experience of use with multi gear adjustable thrust ratio.

SUMMARY

The purpose of the invention is to provide a caulking gun with multi-gear and adjustable thrust ratio, which can provide two or more than two thrust ratios, and has a simple structure, smooth and convenient operation.

The purpose of this invention is as follows:

A caulking gun with multi-gear and adjustable trust ratio, comprising: a fixed handle, a rotating trigger, a caulk tube mounting barrel, a pusher plate and a pusher rod, and the connecting part of the rotating trigger can be pivotally connected to the fixed handle through a gear adjustment mechanism so that the rotating trigger can be rotated around the connection in an angle range, the upper end close to the pusher plate of the rotating trigger can be separately driven to the pusher plate so that the pusher plate can push the caulk tube installed in the caulk tube mounting barrel under the action of rotating the trigger, wherein the gear adjustment mechanism comprises a segmented circular limiting hole, a sliding groove and a segmented cylinder fixed pin. The sliding groove is on the connection part of the rotating trigger, and the connection part is a hollow structure with two sides, the sliding groove runs through the two sides of the rotating trigger in the depth direction to form two symmetrical sliding groove opening on two sides, each sliding groove opening is formed by successively connecting at least two locating holes with same diameter, the connecting width of the adjacent locating holes is smaller than the diameter of the locating hole to form the limiting teeth in the adjacent joint. The segmented circular limiting hole is located on the fixed handle, the fixed handle is partially accommodated in the connection part of the rotating trigger to so that the segmented circular limiting hole will be located in the sliding groove. The segmented cylinder fixed pin passes through the segmented circular limiting hole along the depth direction of the sliding groove and locked by the segmented circular limiting hole, the both ends of the segmented cylinder fixed pin respectively extend form the corresponding sliding groove opening. The narrowest width of the junction of the two locating holes is the passing width of the limiting teeth, and the minimum width of the segmented cylinder fixed pin is slightly smaller than the passing width of the limiting teeth.

The shape of the segmented circular limiting hole is consistent with the shape of the cross section of the segmented cylinder fixed pin, so that when the segmented cylinder fixed pin passes through the segmented circular limiting hole and is locked by segmented circular limiting hole so that it cannot rotate.

When pulling the rotating trigger, the rotating trigger is rotating by taking the trigger fixed pin as the fulcrum, and uses the principle of leverage to push the trigger pusher pin to act on the pusher plate and provide a thrust to the pusher plate, then the pusher plate pushes the pusher rod linked with it, and the pusher rod acts on the caulk tube disposed in the caulk tube mounting barrel to push forward to extrude the silicone. The distance from the main stress position of the rotating trigger to the trigger fixed pin forms the power arm of the lever, and the distance from the trigger pusher pin to the trigger fixed pin forms the resistance arm of the lever, and the ratio constitutes what is called the thrust ratio of the caulking gun.

When it is necessary to adjust the thrust ratio of the caulking gun, first rotate the rotating trigger to a specific angle range against the segmented cylinder fixed pin, and at this point, the sliding groove on the rotating trigger is synchronously rotates to the specified angle range against segmented cylinder fixed pin, at this point, the direction of the minimum width of the segmented cylinder fixed pin and the direction of the passing width of the limiting teeth are exactly parallel or roughly parallel to each other, so that the segmented cylinder fixed pin can just pass through the limiting teeth. Then move the rotating trigger so that the segmented cylinder fixed pin moves relatively between the limiting teeth in the sliding groove along the groove to another locating hole corresponding to the required thrust ratio, and finally in the new locating hole rotates the rotating trigger again against the segmented cylinder fixed pin to an angle outside the specified angle range so that the segmented cylinder fixed pin is matched with the new locating hole and positioned solidly (that is, it cannot slide between the limiting teeth in sliding groove), the adjustment of the thrust ratio is completed, and the caulking gun is ready to use in a new thrust ratio.

When it needs to be adjusted again, re-rotate the rotating trigger to the above-mentioned specific angle range, and then move the rotating trigger so that the segmented cylinder fixed pin moves relatively along the groove in the sliding groove to the corresponding locating hole of the desired thrust ratio, and finally rotate the rotating trigger to an angle other than the specific angle range so that the segmented cylinder fixed pin is matched with the locating hole and positioned solidly to complete the re-adjustment of the thrust ratio, then the caulking gun is ready to use again.

The caulking gun with multi-gear and adjustable thrust ratio proposed by the invention adopts the above-mentioned technical solution, so that the segmented cylinder fixed pin can be relatively slided in the sliding groove and rotated and fixed at different positions. In this way, the distance between the connection point of the fixed handle and the rotating trigger and the pusher rod of the trigger can be changed, so as to realize the multi-gear adjustment of the thrust ratio of the caulking gun; The structure is simple, the adjustment speed is fast, and there are many adjustment gears, so that it can fill the blank of multi-gear adjustable thrust ratio caulking guns in the market.

Wherein, the segmented cylinder fixed pin is a single-sided segmented cylinder fixed pin, alternatively, the segmented cylinder fixed pin can also be set as a double-sided segmented cylinder fixed pin.

Wherein, the sliding groove of the gear adjustment mechanism has two, three or four locating holes, so that the user can choose among different propulsion ratios.

As an alternative implementation method, the sequential connection of the at least two locating holes with the same aperture comprising: the rearward end of one of the two adjacent locating holes partially overlaps the head of the other locating hole to connect.

As an alternative implementation method, the sequential connection of the at least two locating holes with the same aperture comprising: a connecting short groove is also provided between two adjacent locating holes, and the two ends of the connecting short groove respectively connect the rearward end of locating hole and the head of the other locating hole.

Wherein, the caulking gun with multi-gear adjustable thrust ratio also comprising a reset mechanism, which connects the fixed handle and the rotating trigger, so that although the rotating trigger is turning toward the fixed handle, it can return to the initial position by this reset mechanism.

As an alternative implementation method, the reset mechanism might be a spring, the spring is arranged at the lower position of the connection between the fixed handle and the rotating trigger, one end of the spring is connected to the fixed handle, the other end is connected to the rotating trigger. After the rotating trigger is turned, it can return to the initial position under the action of the restoring force of the spring.

DESCRIPTION OF THE DRAWINGS

A better understanding of the other advantages and characteristics of the present invention may be realized from a consideration of the following detailed description, taken in conjunction with the accompanying drawings. The example is given in the form of an instance, but it is not limited to this. Wherein.

DETAILED DESCRIPTION OF THE PREFERRED EMBODIMENT

Figure 1:
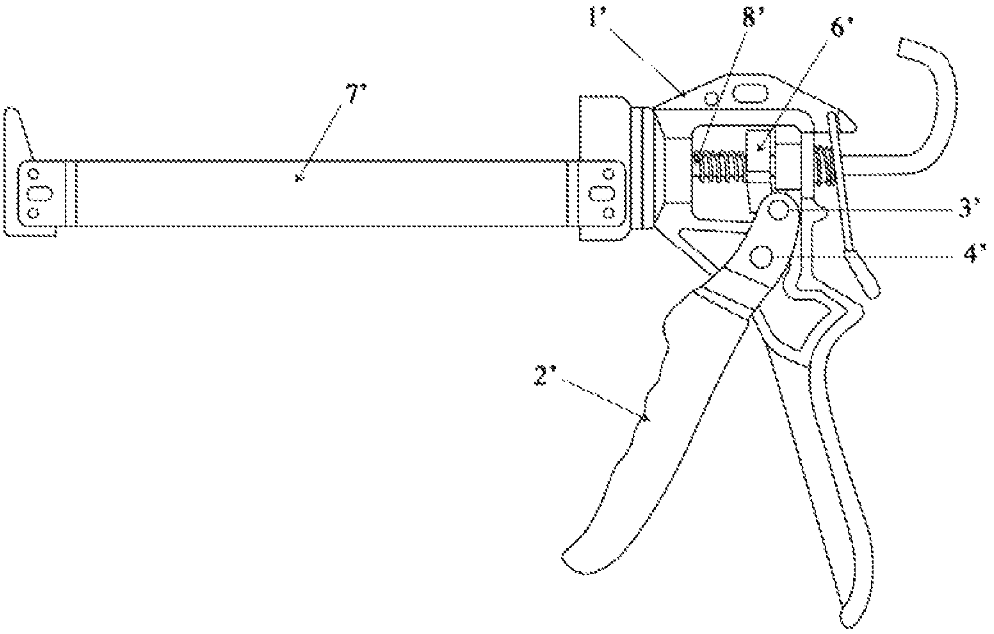
FIG. 1 is a schematic view of a caulking gun in accordance with the existing technology, in which caulking gun has only one thrust ratio.
Figure 2:
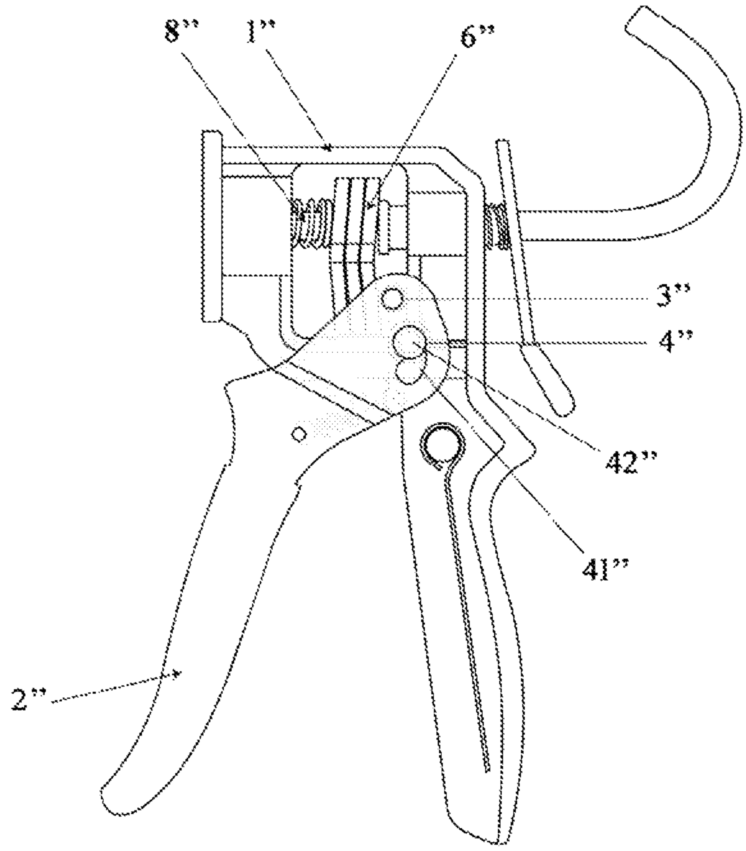
FIG. 2 is a schematic view of a caulking gun in accordance with the existing technology, in which caulking gun has two thrust ratio.
Figure 3:
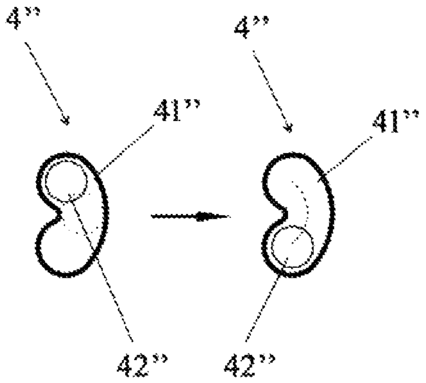
FIG. 3 is a schematic view of the position change track of the adjustment mechanism of the caulking gun shown in FIG. 2.
Figure 4:
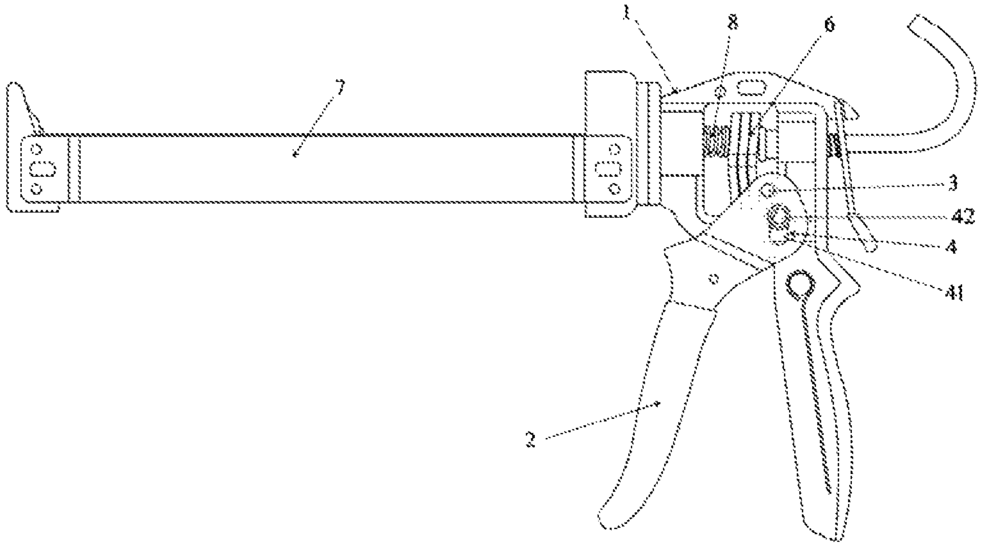
FIG. 4 is a schematic view of a preferred embodiment of a caulking gun with multi-gear and adjustable thrust ratio proposed by the invention.
Figure 5:
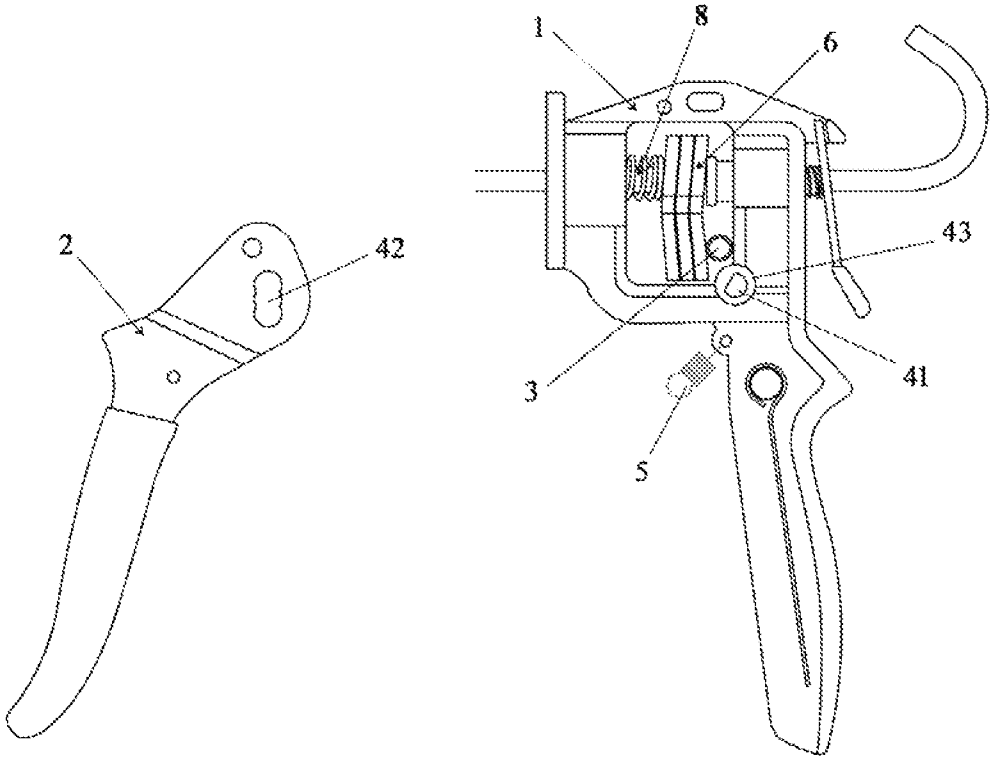
FIG. 5 is an exploded view of the partial structure of the caulking gun of the embodiment shown in FIG. 4, showing the structure of fixed handle and rotating trigger.

As shown in FIG. 4 and FIG. 5, the caulking gun with multi-gear and adjustable thrust ratio comprising a fixed handle 1, a rotating trigger 2, a pusher plate 6, a pusher rod 8 and a caulk tube mounting barrel 7, and the rotating trigger 2 can be pivotally connected to the fixed handle 1 through a gear adjustment mechanism 4, and the end close to the pusher plate 6 of the rotating trigger 2 is equipped with a trigger pusher pin 3, which is usually a horizontal shaft-shaped structure, and can separately reach and drive the pusher plate 6 so that the pusher plate 6 can push the pusher rod 8 under the action of rotating trigger 2 and then push the caulk tube arranged in caulk tube mounting barrel 7 to extrude the caulk. In addition, the lower part of the connection between the fixed handle 1 and the rotating trigger 2 is connected between the fixed handle 1 and the rotating trigger 2 through the spring 5, so that when the rotating trigger 2 is turned, it can be returned to the original position under the action of the restoring force of the spring 5.

In the above structure, except the gear adjustment mechanism 4 (which will be described in detail later), other structures can adopt the structure of the existing caulking gun with adjustable thrust ratio or non-adjustable thrust ratio. These structures are not within the scope of the improved structure by the present invention, so they will not be described in detail.

The gear adjustment mechanism 4 is the key part of this invention. As shown in FIG. 4 and FIG. 5, the segmented cylinder fixed pin 41, which is the fulcrum of this leverage mechanism, can be moved in the sliding groove 42 on the rotating trigger 2, thus the distance between pushing pin 3 and the segmented cylinder fixed pin 41, which is the resistance arm of the leverage, can be adjusted. In this way, the thrust ratio of this caulking gun can be changed to meet the user's preference for squeezing the selected caulk with specific viscosity.

The gear adjustment mechanism 4 of the caulking gun with multi-gear and adjustable thrust ratio proposed by the present invention will be further described below with reference to FIGS. 6-12.

Figure 6:
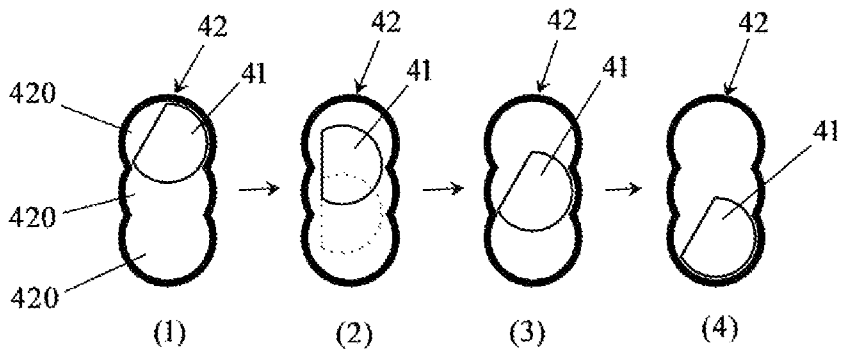
FIG. 6 is a schematic view of the track changes in different positions of a preferred embodiment of the gear adjustment mechanism of a caulking gun with multi-gear and adjustable thrust ratio proposed by the invention.
Figure 10:
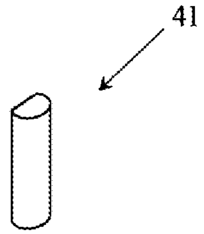
FIG. 10 is a schematic view of a preferred embodiment of the segmented cylinder fixed pin of a caulking gun with multi-gear and adjustable thrust ratio proposed by the invention, wherein the segmented cylinder fixed pin is a single-sided segmented cylinder fixed pin.

A preferred embodiment of the gear adjustment mechanism 4 is shown in FIG. 6. The gear adjustment mechanism 4 comprising a segmented cylinder fixed pin 41, a sliding groove 42 and a segmented circular limiting hole 43 (see FIG. 5). Wherein, the segmented cylinder fixed pin 41 is a one-sided segmented cylinder fixed pin (as shown in FIG. 10); the sliding groove 42 is arranged on the connection part of the rotating trigger 2 and the connection part is a hollow structure with two sides, and the sliding groove 42 crosses through the two sides of the connecting part of rotating trigger 2 in the depth direction so that two sliding groove openings with symmetrical shapes are formed symmetrically on both sides, each sliding groove opening is formed by at least two locating holes 420 with the same aperture, partially overlapped on the head and rearward end, the narrowest connecting width of the adjacent locating holes 420 is smaller than the aperture of the locating hole 420 so as to form a limiting teeth at the joint. The segmented circular limiting hole 43 is located on the fixed handle 1 for limiting the segmented cylinder fixed pin 41, the fixed handle 1 is provided with a segmented circular limiting hole 43 partially contained in the connecting part of the rotating trigger 2 so that the segmented circular limiting hole 43 is located in the sliding groove 42. The shape of the segmented circular limiting hole 43 is consistent with the shape of the cross section of the segmented cylinder fixed pin 41, so that when the segmented cylinder fixed pin 41 passes through the segmented circular limiting hole 43 along the depth direction of the sliding groove 42, it is locked by the segmented circular limiting hole 43 and can not be rotated. And the two ends of segmented cylinder fixed pin 41 stretch out from its corresponding sliding groove opening respectively, and are fixed from outside. The connecting width of the adjacent locating holes 420 is the passing width of the limiting teeth, and the minimum width of the segmented cylinder fixed pin 41 is slightly smaller than the passing width of the limiting teeth. The track change of the gear adjustment mechanism 4 during the adjustment process is shown in FIG. 6. When the rotating trigger 2 rotates to a specific angle range relative to the segmented cylinder fixed pin 41, correspondingly the sliding groove 42 also rotates to the specific angle range with the rotating trigger 2 relative to the segmented cylinder fixed pin 41, the direction of the minimum width of the segmented cylinder fixed pin 41 and the direction of the passing width of the limiting teeth are exactly parallel or roughly parallel to each other, so that the segmented cylinder fixed pin 41 can just pass through the limiting teeth. When the sliding groove 42 rotates to an angle outside the specified angle range with the rotating trigger 2 relative to the segmented cylinder fixed pin 41, the size of the segmented cylinder fixed pin 41 in the width direction of the sliding groove 42 is larger than the passing width of the limiting teeth, then the segmented cylinder fixed pin 41 is matched with the locating hole 420 and positioned firmly, and the segmented cylinder fixed pin 41 cannot slide between the limiting teeth in the sliding groove 42. The caulking gun adopting the gear adjustment mechanism 4 described in this embodiment can choose from three different thrust ratios, and the gear adjustment is more stable without slipping.

Figure 7:
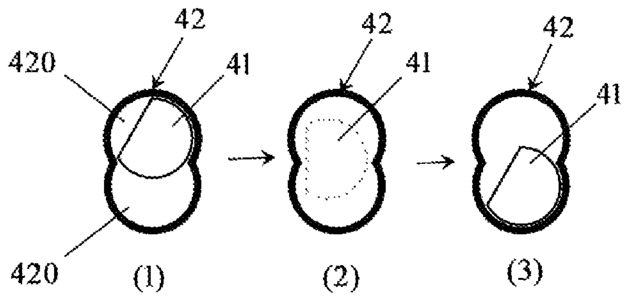
FIG. 7 is a schematic view of the track changes in different positions of another preferred embodiment of the gear adjustment mechanism of a caulking gun with multi-gear and adjustable thrust ratio proposed by the invention.

Continue to show another preferred embodiment of the gear adjustment mechanism 4 as shown in FIG. 7. Similar in structure to the previous embodiment, the gear adjustment mechanism 4 in this embodiment also comprising: a segmented cylinder fixed pin 41, a sliding groove 42 and a segmented circular limiting hole 43. Wherein, the segmented cylinder fixed pin 41 is a one-sided segmented cylinder fixed pin, the sliding groove 42 is arranged on the connection part of the rotating trigger 2 and the connection part is a hollow structure with two sides, and the segmented circular limiting hole 43 is located on the fixed handle 1 for limiting the segmented cylinder fixed pin 41, the fixed handle 1 is provided with a segmented circular limiting hole 43 partially contained in the connecting part of the rotating trigger 2 so that the segmented circular limiting hole 43 is located in the sliding groove 42. What is different from the previous embodiment is that in this embodiment, the groove in the sliding groove 42 is designed to have only two locating holes 420, and the same two locating holes 420 are still connected sequentially. The caulking gun adopting the gear adjustment mechanism 4 described in this embodiment can choose from two different thrust ratios. Compared with the two-gear caulking gun in accordance with the existing technology, the gear adjustment in this embodiment is more stable without slipping.

Figure 8:
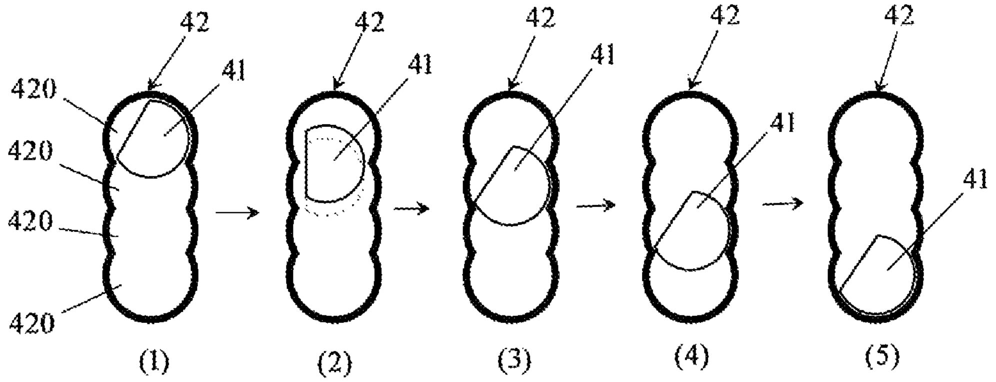
FIG. 8 is a schematic view of the track changes in different positions of another preferred embodiment of the gear adjustment mechanism of a caulking gun with multi-gear and adjustable thrust ratio proposed by the invention.

Continue to show another preferred embodiment of the gear adjustment mechanism 4 as shown in FIG. 8, similar in structure to the previous two embodiments, the gear adjustment mechanism 4 in this embodiment also comprising a segmented cylinder fixed pin 41, a sliding groove 42 and a segmented circular limiting hole 43, wherein, the segmented cylinder fixed pin 41 is a one-sided segmented cylinder fixed pin, and the shape of the corresponding segmented circular limiting hole 43 is also the same one-side segmented circle, the sliding groove 42 is arranged on the connection part of the rotating trigger 2 and the connection part is a hollow structure with two sides, segmented circular limiting hole 43 is located on the fixed handle 1 for limiting the segmented cylinder fixed pin 41, the fixed handle 1 is provided with a segmented circular limiting hole 43 partially contained in the connecting part of the rotating trigger 2 so that the segmented circular limiting hole 43 is located in the sliding groove 42. What is different from the previous embodiments is that in this embodiment, the groove in the sliding groove 42 is designed to have four locating holes 420, and the same four locating hole 420 are still connected sequentially. The caulking gun adopting the gear adjustment mechanism 4 described in this embodiment can choose from four different thrust ratios, and the gear adjustment is more stable without slipping.

Figure 11:
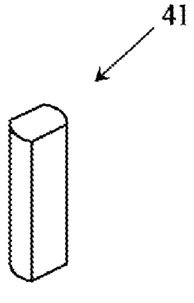
FIG. 11 is a schematic view of another preferred embodiment of the segmented cylinder fixed pin of a caulking gun with multi-gear and adjustable thrust ratio proposed by the invention, wherein the segmented cylinder fixed pin is a double-sided segmented cylinder fixed pin.
Figure 12:
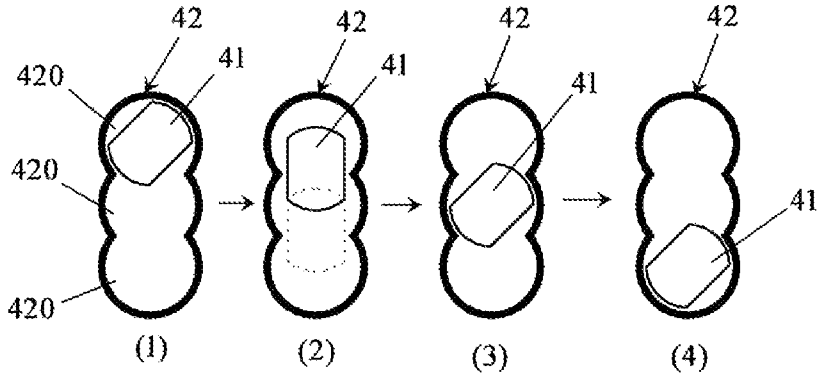
FIG. 12 is a schematic view of the track changes in different positions of another preferred embodiment of the gear adjustment mechanism of a caulking gun with multi-gear and adjustable thrust ratio proposed by the invention. In this embodiment, the gear adjustment mechanism adopts a segmented cylinder fixed pin structure as shown in FIG. 11.

FIG. 11 and FIG. 12 show the schematic view of another preferred embodiment of the segmented cylinder fixed pin of a caulking gun with multi-gear and adjustable thrust ratio proposed by the invention. As shown in the figure, the segmented cylinder fixed pin 41 is designed as a double-sided segmented cylinder fixed pin, and the shape of the corresponding segmented circular limiting hole 43 is also the same as the segmented cylinder fixed pin.

Figure 9:
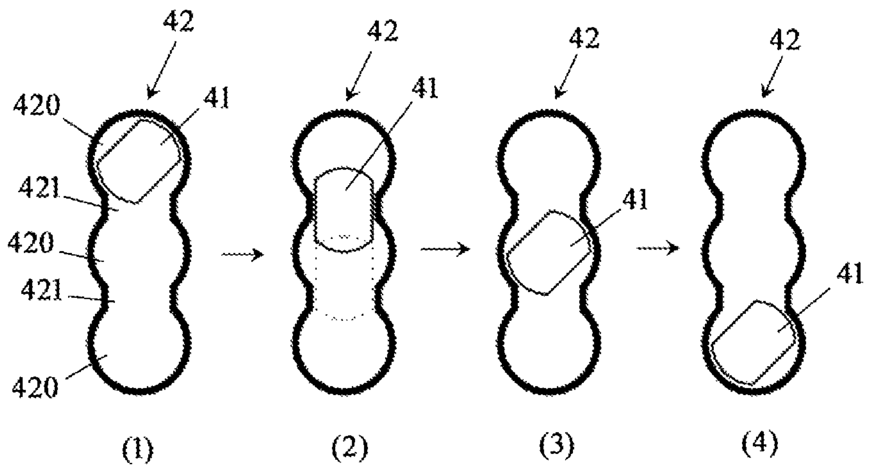
FIG. 9 is a schematic view of the track changes in different positions of another preferred embodiment of the gear adjustment mechanism of a caulking gun with multi-gear and adjustable thrust ratio proposed by the invention.

As an alternative implementation method, the sliding groove 42 of the caulking gun with multi-gear and adjustable thrust ratio proposed by the invention can be connected through the rearward end of one of the two adjacent locating holes 420 is partially overlapped and connected with the head of the other locating hole 420, it can also be connected through short connecting groove 421, as shown in FIG. 9, a short connecting groove 421 is provided between adjacent locating holes 420, the two ends of short connecting groove 421 are respectively connected with the rearward end of one locating hole 420 and the head of another locating hole 420, then the width of short connecting groove 421 is the passing width of the limiting teeth, and the passing width of the limiting teeth is smaller than the diameter of the locating hole 420, but slightly larger than the minimum width of the segmented cylinder fixed pin 41, so that the segmented cylinder fixed pin 41 can pass the limiting teeth at a specific angle as previously described.

While certain representative embodiments of the invention have been described hereabove for the purposes of illustration, however, this does not mean that the scope of the invention is limited to the above structure, it is easy for those skilled in the art to find the equivalent alternative structure after reading the above instructions, any equivalent changes and modifications made without departure from the spirit and scope of the invention shall be covered in the scope of the patent of the invention.

What is claimed is:

1. A caulking gun with multi-gear and adjustable thrust ratio comprising:

a fixed handle, a rotating trigger, a caulk tube mounting barrel, a pusher plate and a pusher rod, wherein a connecting part of the rotating trigger is pivotally connected to the fixed handle through a gear adjustment mechanism so that the rotating trigger is rotated around the connecting part within a range of angle, and an upper end, close to the pusher plate, of the rotating trigger is separably driven to and pushes the pusher plate so that the pusher plate pushes a caulk tube installed in the caulk tube mounting barrel at an adjustable thrust ratio, under an action of the rotating trigger, wherein the gear adjustment mechanism comprises:

a sliding groove, having a hollow structure located on two sides of the rotating trigger, running through along a depth direction to form two symmetrical sliding groove openings on two sides, with each sliding groove opening being formed by at least two successively connecting locating holes with same diameter forming a set of limiting teeth in an adjacent joint, wherein the narrowest width of the junction of these at least two successively connecting locating holes is the passing width of the limiting teeth, which is slightly larger than the minimum width of a segmented cylinder fixed pin, but is smaller than the diameter of the locating holes;

a segmented circular limiting hole located on the fixed handle and accommodated inside the connecting part of the rotating trigger, so that the segmented circular limiting hole is placed in and covered by the sliding groove;

the segmented cylinder fixed pin passes through the segmented circular limiting hole along the depth direction of the sliding groove and locked by the segmented circular limiting hole, with both ends of the segmented cylinder fixed pin respectively extending out from the corresponding sliding groove opening, wherein a shape of the segmented circular limiting hole is consistent with a shape of a cross section of the segmented cylinder fixed pin, in order to lock the segmented cylinder fixed pin for restricting a rotation of the segmented cylinder fixed pin in the segmented circular limiting hole,-thereby creating a rotation-locked segmented cylinder fixed pin, and wherein the rotating trigger is rotated in a first angle range, and in a second angle range, outside of the first angle range, relative to the rotation-locked segmented cylinder fixed pin.

2. The caulking gun with multi-gear and adjustable thrust ratio as set forth in claim 1, wherein the segmented cylinder fixed pin is a unilateral or one-sided segmented cylinder fixed pin, and the shape of the corresponding segmented circular limiting hole is also the same unilateral or one-side segmented circle.

3. The caulking gun with multi-gear and adjustable thrust ratio as set forth in claim 1, wherein the segmented cylinder fixed pin is a bilateral or two-sided segmented cylinder fixed pin, and the shape of the corresponding segmented circular limiting hole is also the same bilateral or two-side segmented circle.

4. The caulking gun with multi-gear and adjustable thrust ratio as set forth in claim 1, wherein the sliding groove has two, three or four locating holes.

5. The caulking gun with multi-gear and adjustable thrust ratio as set forth in claim 1, wherein a sequential connection of at least two successively connecting locating holes with the same diameter comprising the rearward end of one of the two or more adjacent locating holes is partially overlapped and connected with a head of another adjacent locating hole.

6. The caulking gun with multi-gear and adjustable thrust ratio as set forth in claim 1, wherein a sequential connection of at least two successively connecting locating holes with the same diameter comprising two or more adjacent locating holes having a short connecting groove, both ends of which are respectively connected with the rearward end of one locating hole and a head of another adjacent locating hole.

7. The caulking gun with multi-gear and adjustable thrust ratio as set forth in claim 1, further comprising a reset mechanism connecting the fixed handle and the rotating trigger so that after the rotating trigger is rotated up into the first angle range to achieve the adjustment of thrust ratio, the rotating trigger returns, under the action of the reset mechanism, to the second angle range which is the original position wherein the caulking gun performs its caulking job.

8. The caulking gun with multi-gear and adjustable thrust ratio as set forth in claim 7, wherein the reset mechanism is a spring, and the spring is arranged at the lower position of the junction of the fixed handle and the rotating trigger, wherein one end of the spring is connected to the fixed handle and the other end is connected to the rotating trigger.

9. The caulking gun with multi-gear and adjustable thrust ratio as set forth in claim 1, wherein the first angle range defines a gear adjusting position, whereby at least one of the limiting teeth passes around the rotation-locked segmented cylinder fixed pin so that these at least two successively connecting locating holes can be shifted to accommodate the rotation-locked segmented cylinder fixed pin in one of these at least two successively connecting locating holes, to achieve the adjustment of thrust ratio of the caulking gun.

10. The caulking gun with multi-gear and adjustable thrust ratio as set forth in claim 9, wherein, in the second angle range, the rotation-locked segmented cylinder fixed pin is limited in one of these at least two successively connecting locating holes, so as to complete the adjustment of thrust ratio of the caulking gun, and provide a fixed thrust ratio selected during the adjustment of thrust ratio in the first angle range.

* * * * *